United States Patent [19]

Mueller

[11] Patent Number: 5,167,274

[45] Date of Patent: Dec. 1, 1992

[54] METHOD AND APPARATUS FOR COOLING PARTICULATE SOLIDS

[75] Inventor: Markus M. Mueller, Calgary, Canada

[73] Assignee: Cominco Ltd., Vancouver, Canada

[21] Appl. No.: 772,400

[22] Filed: Oct. 7, 1991

[51] Int. Cl.⁵ ............................ F28F 3/12; F28F 3/14; F28D 1/02

[52] U.S. Cl. .......................................... 165/1; 165/13; 165/47; 165/920; 165/170; 34/165; 71/64.03

[58] Field of Search ...................... 165/1, 47, 920, 13, 165/165, 166, 170; 34/177, 165; 71/64.03, 64.06, 64.07, 64.11

[56] References Cited

U.S. PATENT DOCUMENTS

| | | | |
|---|---|---|---|
| 1,999,026 | 4/1935 | Tramm et al. | 71/64.03 |
| 2,804,383 | 8/1957 | Pike | 71/64.03 |
| 3,181,488 | 5/1965 | Roe et al. | 34/177 |
| 3,397,460 | 8/1968 | Hall | 165/920 |
| 3,458,917 | 8/1969 | Mueller | 29/890.042 |
| 4,546,821 | 10/1985 | Kummel | 165/920 |
| 4,585,051 | 4/1986 | Leung et al. | 165/920 |
| 4,784,216 | 11/1988 | Bracegirdle et al. | 165/920 |
| 4,867,930 | 9/1989 | Alfrey | 71/64.06 |

Primary Examiner—John K. Ford
Attorney, Agent, or Firm—Arne I. Fors

[57] ABSTRACT

Free-flowing solid particulates are cooled in an apparatus comprising a housing containing a multiplicity of parallel, vertical, expanded heat exchanger plates spaced at 15-100 mm and having passages therebetween. Each plate has continuous flow channels for cooling fluid therein. A fluid inlet and outlet are attached to the flow channels in each plate and common fluid inlet and outlet headers are attached to the inlets and outlets, respectively. A feed hopper for feeding particulates to the passages is positioned above and attached to the housing. A discharge hopper for receiving cooled particulates from the passages is positioned below and attached to the housing. The discharge hopper contains two adjacent parallel bins each having a swinging section operatively connected to an actuator activated by a level control means positioned in the feed hopper. Particulates such as fertilizer particulates, are fed into the feed hopper and pass downward in a mass flow regime between the heat exchanger plates where they are cooled with a fluid, preferably water, that passes through the plates. Cooled particulates collect in the discharge hopper from which they are discharged at a rate controlled by the actuator and level controller so that the plates are maintained in a flooded state with respect to the particulates. Attrition and abrasion of the particulates are substantially eliminated.

7 Claims, 7 Drawing Sheets

METHOD AND APPARATUS FOR COOLING PARTICULATE SOLIDS

This invention relates to the cooling of solids and, more particularly to a method and apparatus for the cooling of particulate solids such as fertilizers.

BACKGROUND OF THE INVENTION

The manufacture of particulate fertilizers is generally carried out by agglomeration or prilling processes whereby particulates such as prills or granules of the fertilizer are formed. There are numerous agglomeration and prilling processes known for the manufacture of fertilizers such as ammonium nitrate, urea, potash, phosphates and mixtures thereof. Agglomeration processes are generally carried out in paddle mixers, pug mills, rotary drums, pans or fluidized beds. Prilling processes are usually carried out in prilling vessels such as prilling towers.

In many cases it is necessary to cool the particulates so formed to a reasonably low temperature to avoid undesirable phenomena such as caking. The cooling of particulates has been conventionally carried out with cooling air in a cooling vessel such as a rotating drum or a fluidized bed. Because of the intense motions and turbulence of the particulates in such vessels, the particulates are subject to attrition and abrasion that result in a breakdown of the particulates with the formation of fines and dust. This breakdown is highly undesirable. Not only does the formation of fines and dust reduce the efficiency of the above-mentioned processes, but the additional treatments that are necessary for the removal of fines and dust from the product add considerably to the costs. The fines and dust must be screened from the product, and the cooling air, which contains a portion of the dust, must be treated for the substantial removal of the dust before the air can be returned to the atmosphere.

In order to reduce attrition and abrasion it would be necessary to avoid the intense motion and turbulence during cooling. Such intense motion appears to have been somewhat reduced in the cooler for hot lime disclosed in U.S. Pat. No. 3 397 460. The cooler includes an indirect heat exchanger comprising a plurality of horizontal air ducts mounted in tiers to form vertical passages for the lime, the tiers being connected with transfer boxes, and a direct heat exchanger for cooling lime received from the passages with air. This cooler and its tiers of interconnected air ducts is of a rather complex construction and the free falling material and the direct heat exchanger still would cause considerable motion with resultant attrition.

In heat exchange between two liquids, or liquids and gases, use is often made of one or more spaced heat exchanger plates over which one fluid flows and through which the cooling fluid passes in indirect heat exchange. Such plates are used in vaporizers, dryers, heaters, condensers and coolers, and are based on disclosures such as made in U.S. Pat. No. 3 458 917. A heat exchanger plate according to this patent consists of two flat plates that are circumferentially seam-welded together, are provided with a pattern of spot or seam welds or both and are expanded between welds by introducing high-pressure fluid into the spaces between welds. The expanded plate has a smooth outside surface with numerous small pillow-like embossments between spot welds. The pillows are hollow and interconnected to provide flow channels for a cooling fluid. The pattern of seam welds may provide a serpentine passage for the cooling fluid through the plate. An inlet and an outlet for the fluid are attached to the plate. According to a catalogue of the Paul Mueller Company, the plates are used in various shapes and configurations, one of those being in packs of spaced plates with common inlet and outlet headers. No mention is made of cooling solids or particulate materials.

SUMMARY OF THE INVENTION

It has now been surprisingly found that the attrition and abrasion of solid particulates, such as particulate fertilizers, can be substantially eliminated during cooling. More specifically, hot particulates are readily cooled to a desired lower temperature by flowing particulates downward between closely spaced, expanded heat exchanger plates through which a cooling fluid is passed.

The apparatus according to the invention comprises a heat exchange housing containing a multiplicity of parallel, closely spaced, vertical, expanded heat exchanger plates each having an inlet and an outlet, the inlet and outlets being connected into common inlet and outlet headers. A feed hopper is attached to the housing and is positioned above the multiplicity of plates and in communication with the spaces between the plates. A discharge hopper is attached to the lower end of the housing, and is positioned below the multiplicity of plates and in communication with the spaces between the plates. The discharge hopper has means for receiving cooled fertilizer particulates and includes means for the controlled discharging of cooled particulates.

Particulates to be cooled are fed into the feed hopper and descend by gravity in a continuous uninterrupted flow and ensuring mass flow of the particulates in the cooler over the entire cross section of the cooler between the heat exchanger plates. Cooling fluid flows through the heat exchanger plates, preferably in a direction countercurrent to the downward flow of particulates. The particulates are cooled and are collected in the discharge hopper from which they are discharged in a controlled fashion. The flow of particulates through the cooler is controlled to maintain the cooler in a flooded condition with respect to the particulates so that maximum cooling capacity is used and mass flow conditions are maintained. The flooded condition ensures that the particulates descend through the cooler substantially without the turbulence and the motion that would cause shear, friction, attrition and abrasion.

It is, therefore, an object of the present invention to provide a method for the cooling of particulates without attrition and abrasion. It is another aspect to provide an apparatus for the cooling of particulates. Accordingly, there is provided a method for the cooling of substantially free-flowing particulates in a cooler, said cooler including a housing having a cross section and containing a multiplicity of parallel, horizontally and closely spaced, vertical expanded heat exchanger plates having smooth exterior surfaces defining flow passages therebetween, said heat exchanger plates being spaced at a distance in the range of about 15 to 100 mm measured from center to center of said plates, said heat exchanger plates having a thickness in the range of about 5 to 10 mm, each heat exchanger plate having continuous interior flow channels for the flow of cooling fluid therein; a fluid inlet and a fluid outlet in communication with said flow channels in each plate; a common cooling fluid inlet header connected to the fluid inlets of the multiplicity of plates; a common cooling fluid outlet header connected to the fluid outlets of the multiplicity of plates; a feed hopper positioned above and attached to said housing and in communication with said flow passages; and a discharge hopper positioned below and attached to said housing and in communication with said flow passages, said discharge hopper having flow control means for the controlled discharging of particulates from said discharge hopper; comprising the steps of passing a flow of a suitable cooling fluid from said fluid inlet, through said inlet header, through said heat exchanger plates and through said outlet header to said fluid outlet; feeding said particulates to said feed hopper and evenly distributing said particulates over the entire cross section of said housing; passing said particulates through said flow passages from said feed hopper to said discharge hopper by gravity under flooded, mass flow conditions of the particulates in the cooler; collecting said particulates after passing through said flow passages in the discharge hopper for discharge therefrom; and controlling the discharge of the particulates at a rate and in an amount relative to the feed of particulates so that said flow passages and the feed hopper are maintained at all times in said flooded state with respect to said particulates, whereby maximum cooling of the particulates is ensured and whereby said particulates pass through said cooler substantially without turbulence, and abrasion and attrition of the particulates are substantially diminished.

According to preferred embodiments, said controlling is carried out by monitoring the level of the particulates in said feed hopper with a level controller operatively connected to the discharge hopper flow control means, said discharge hopper includes two adjacent parallel tapered bins each having a side comprising a swinging section for allowing the discharge of particulates, sending a signal from said level controller to said flow control means and activating each said swinging section in response to said signal for controlled discharge of said particulates from said cooler at a rate whereby the level of particulates in the feed hopper is maintained at a predetermined level ensuring said flooded state; and said particulates comprise fertilizer particulates and said cooling fluid is a liquid.

BRIEF DESCRIPTION OF THE DRAWINGS

The objects of the invention and the manner in which they are attained will become clear from the following detailed description with reference to the accompanying drawings, wherein:

In FIGS. 2, 3 and 4, the thickness of the heat exchanger plates has been exaggerated for illustrative purposes.

DETAILED DESCRIPTION OF THE INVENTION

Figure 1:
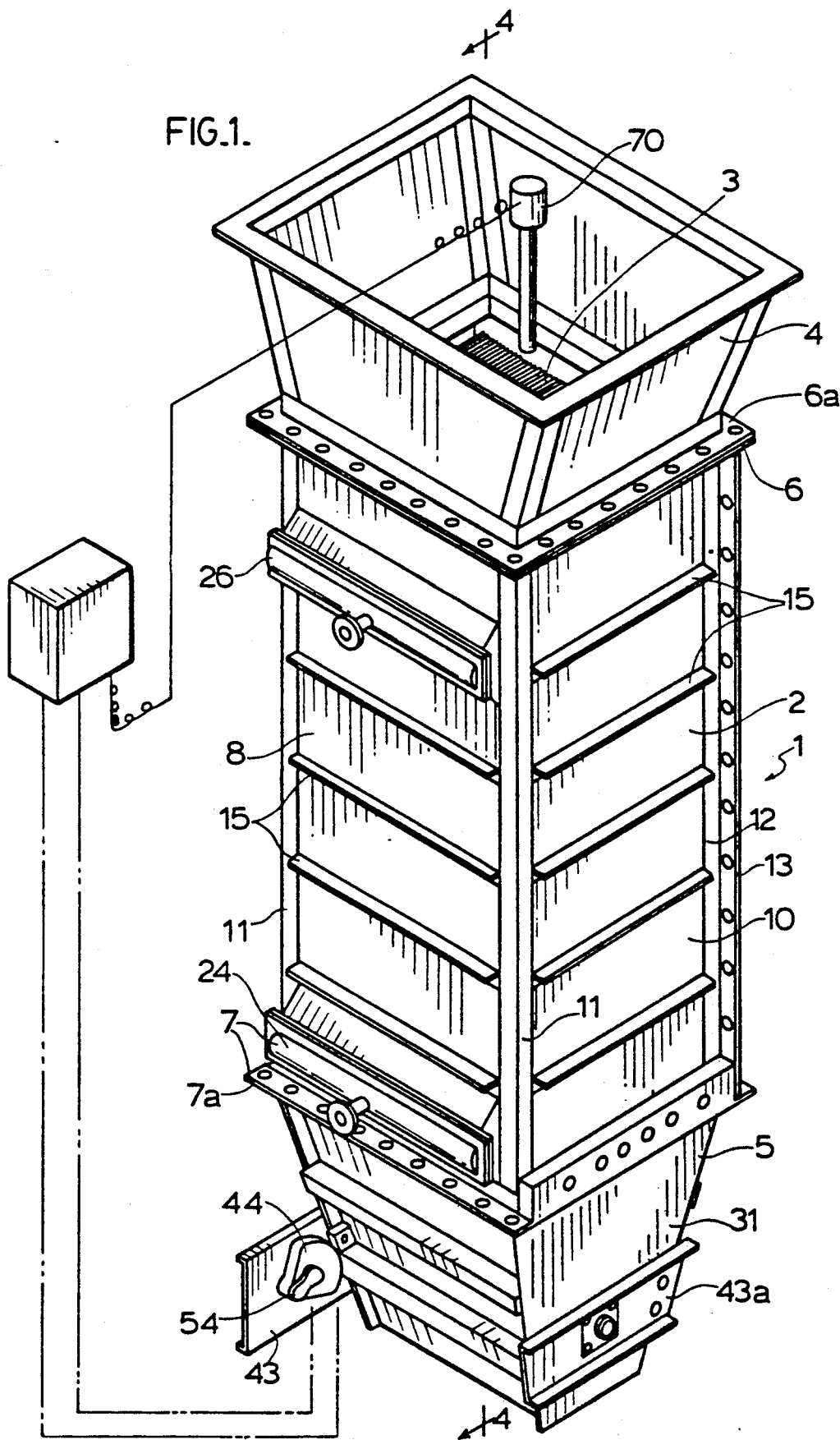
FIG. 1 is an isometric view of the cooler apparatus of the invention.
Figure 2:
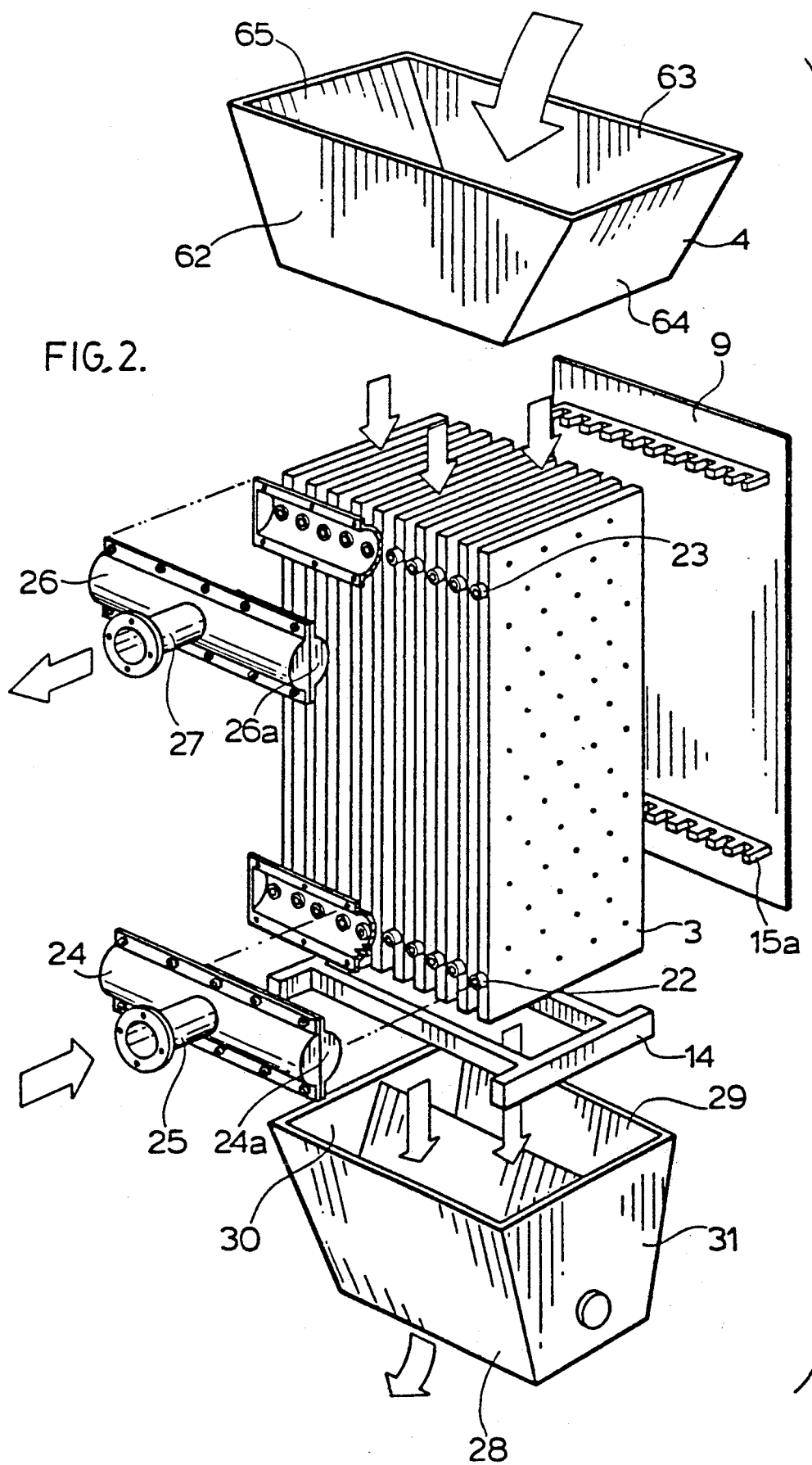
FIG. 2 is an exploded isometric view of the apparatus of the invention with the housing removed to show the heat exchanger plates.
Figure 3:
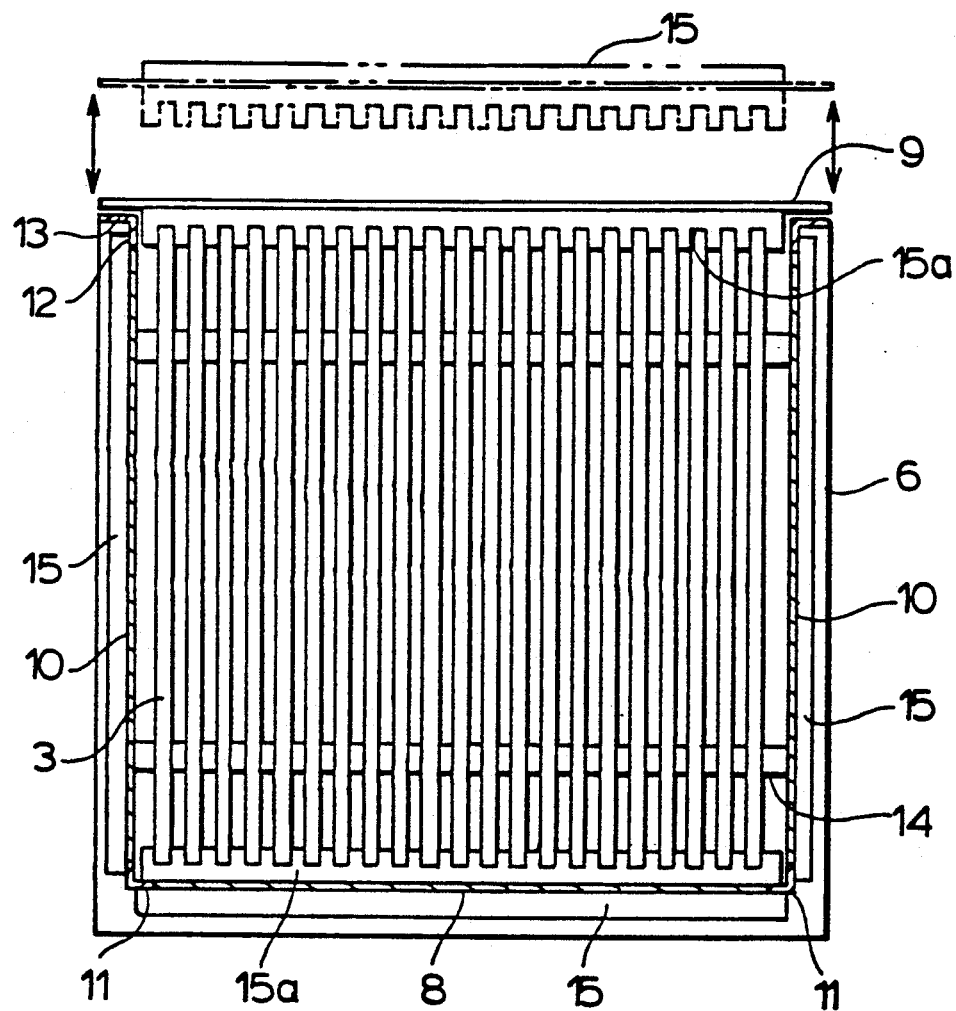
FIG. 3 is a plan view of the heat exchanger plates with removable rear panel.

With reference to FIGS. 1, 2 and 3 the cooler, generally indicated at comprises a housing 2 containing a multiplicity of heat exchanger plates 3, a feed hopper 4 and a discharge hopper 5. Feed hopper 4 and discharge hopper 5 are attached at the upper and lower extremities of housing 2 and have a common center line with the housing. The dimensions of the bottom opening of feed hopper 4, of the top opening of discharge hopper 5 and of the top and bottom openings of housing 2 are the same.

The housing 2 has a generally square or rectangular cross section and comprises a front panel 8, a back panel 9 and two side panels 10. Front panel 8 is attached to and between two corner posts 11 (angle irons). Side panels 10 are each attached to and between a corner post 11 and a corner post 12 (angle iron) such that one side of a corner post 12 is perpendicular to side panels 10 and forms a flange 13 which has means for the removable attachment of back panel 9. The upper extremity of housing 2 has a horizontal circumferential flange 6 for attachment to feed hopper 4, and the lower extremity has a similar, horizontal circumferential flange 7 for attachment to discharge hopper 5, as shown in FIG. 1.

Mounted inside housing 2 is a pack of a multiplicity of vertically positioned, parallel, spaced, expanded heat exchanger plates 3. The pack is supported on support bars 14 that have a small horizontal cross section to provide minimum obstruction and are mounted at the lower extremity of and in housing 2. The pack of plates substantially fills housing 2 leaving only a narrow space between the pack and the panels of the housing. Sufficient space is provided between pack and flanges 6 and 7 to allow the extracting and inserting of one or more plates from the pack after backpanel 9 and headers 24 and 26 (to be described) have been removed from housing 2.

The heat exchanger plates are closely spaced for more efficient heat exchange between the plates and the solids passing therebetween. The spacing of plates is an important parameter as the distance determines the effectiveness of the heat exchange. To effect the same degree of heat exchange, i.e. cooling, a larger spacing between the plates requires a larger apparatus with a larger heat exchange surface. The most effective heat exchange is obtained when the plates are closely spaced. The spacing is in the range of about 15 to 100 mm from center to center of the plates, preferably in the range of about 15 to 50 mm from center to center. As the expanded plates are very thin compared to known heat exchanger plates, an effective spacing of about 25 mm from center to center of the plates is most preferred.

A number of support angles 15, preferably equally spaced, are attached on the outside of panels 8, 9 and 10 essentially between posts 11 and posts 12, and between posts 12, respectively. As shown in FIG. 3, the plates 3 of the pack are evenly and closely spaced in and by notched spacing bars 15a that are welded to corner posts 11 on the inside of front panel 8 and are welded against back panel 9, in positions opposite the exterior support angles 15.

Figure 5:
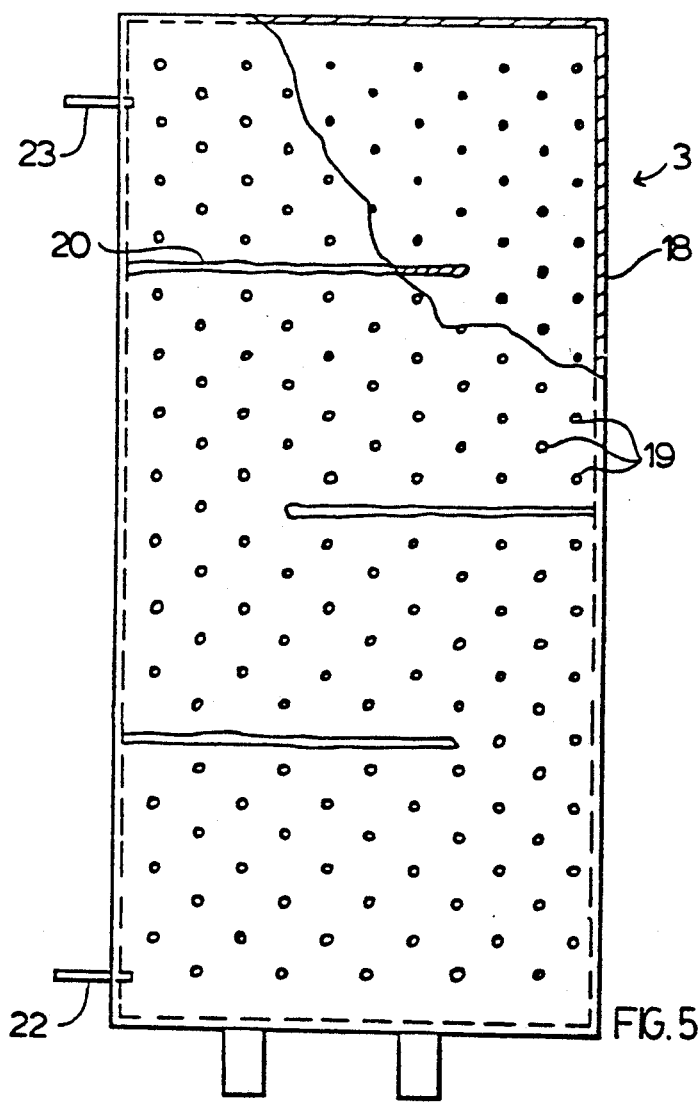
FIG. 5 shows a typical heat exchanger plate, as well as the welding pattern.
Figure 6:
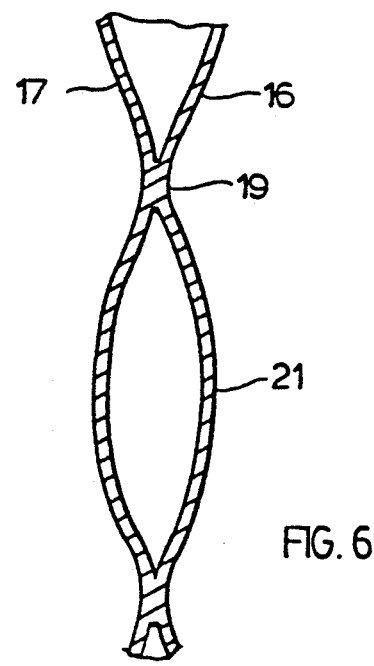
FIG. 6 is a partial section through a typical heat exchanger plate.

With reference to FIGS. 5 and 6, expanded heat exchanger plate 3 consists of two plates 16 and 17 that are welded together around and at their peripheries 18. Both plates 16 and 17 are also spot-welded together over their entire surface in a preferably regular pattern at a multitude of points 19, and are seam-welded at a number of lines 20, each seam weld extending partly and alternately from one side to the other side of a plate. The spaces between the spot welds at points 19 and between the spot welds and the seam welds at lines 20 are mechanically expanded, such as, for example, by hydraulic expansion to form interconnected continuous flow channels through the pillow-like expansions 21 between spot welds and in a serpentine path defined by the seam welds of lines 20 and peripheral weld 18. Alternatively, plates 16 and 17 may be mechanically embossed prior to peripheral welding together to form the mechanically expanded heat exchanger plates 3. The thickness of the expanded heat exchanger plates is usually in the range of about 5 to 10 mm. An inlet 22 for cooling fluid is appropriately attached with one of its ends to the lower end, and an outlet 23 for cooling fluid is similarly attached to the upper end of each of heat exchanger plates 3. With reference to FIGS. 1 and 2, the inlets 22 and the outlets 23 pass through front panel 8 of housing 2 and are seal welded at their distal ends into openings (not shown) in the rear halves 24a and 26a of common cooling fluid inlet header 24 and common cooling fluid outlet header 26, respectively. Inlet header 24 and outlet header 26 are mounted on the outside of front panel 8 of housing 2 and are connected to fluid supply and discharge lines (not shown) by means of short, flanged inlet and outlet pipes 25 and 27, respectively, centrally mounted on the respective headers 24 and 26. The welded attachment of inlets 22 and outlets 23 into headers 24 and 26 allows removal of one or more plates 3 from housing 2 after headers 24 and 26 have been split open, the seal welds at the distal ends of inlets 22 and outlets 23 have been ground off, and back panel 9 has been removed from housing 2 (FIG. 3).

Feed hopper 4 (see FIGS. 1 and 2) has vertically positioned trapezoid-shaped front and rear panels 62 and 63, respectively, and sloping side panels 64 and 65. Feed hopper 4 is open at its top and bottom and is made of angle irons at all of its sides with panels 62, 63, 64 and 65 attached to the angle irons. The angle irons at the lower end of hopper 4 form a circumferential flange 6a that matches flange 6 of housing 2 for attachment thereto. The slope of the side panels 64 and 65 of the feed hopper is greater than the angle of repose of the particulates such that particulates can be easily fed into feed hopper 4.

Figure 7:
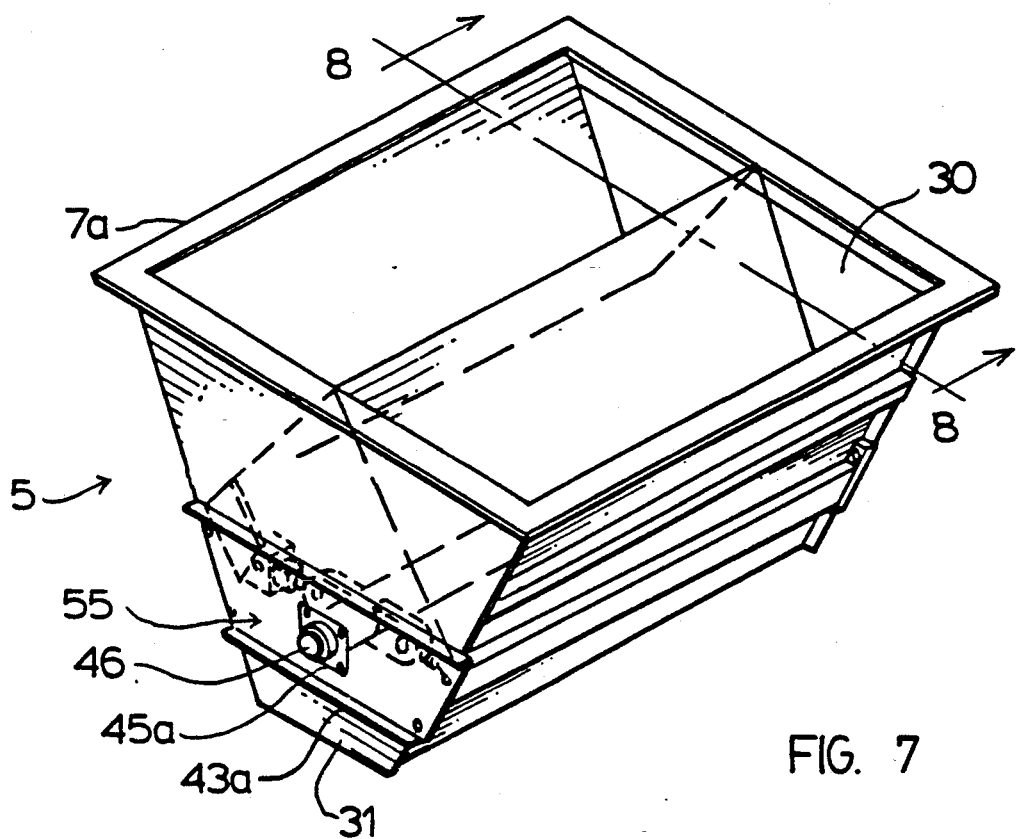
FIG. 7 is an isometric view of the discharge hopper.
Figure 8:
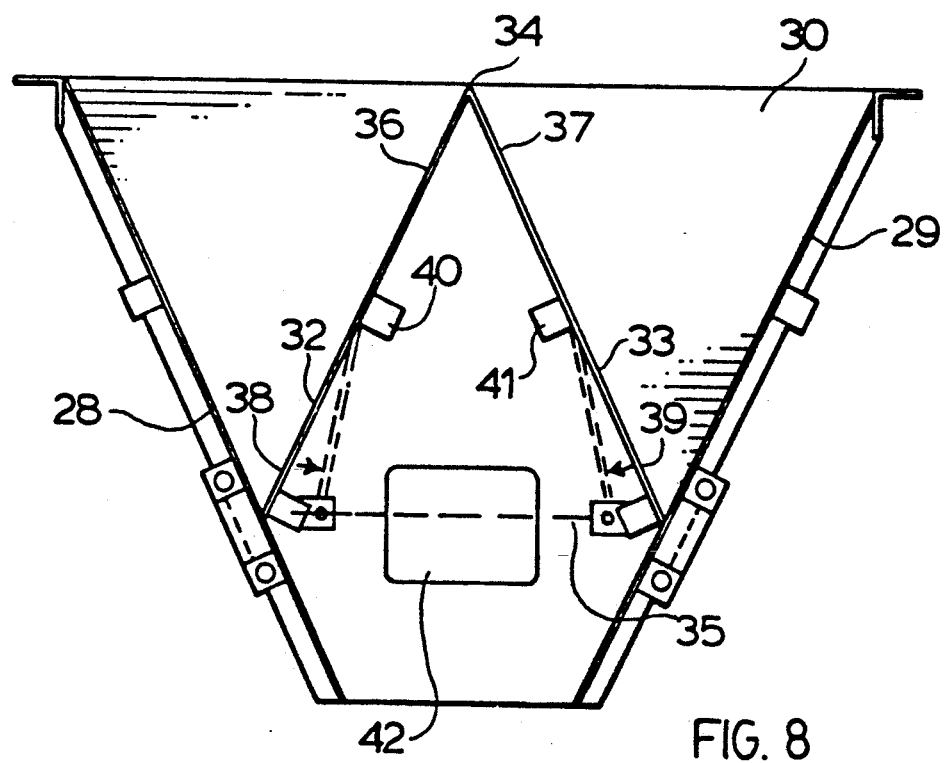
FIG. 8 is a vertical section through the discharge hopper at line 8—8 of FIG. 7.
Figure 9:
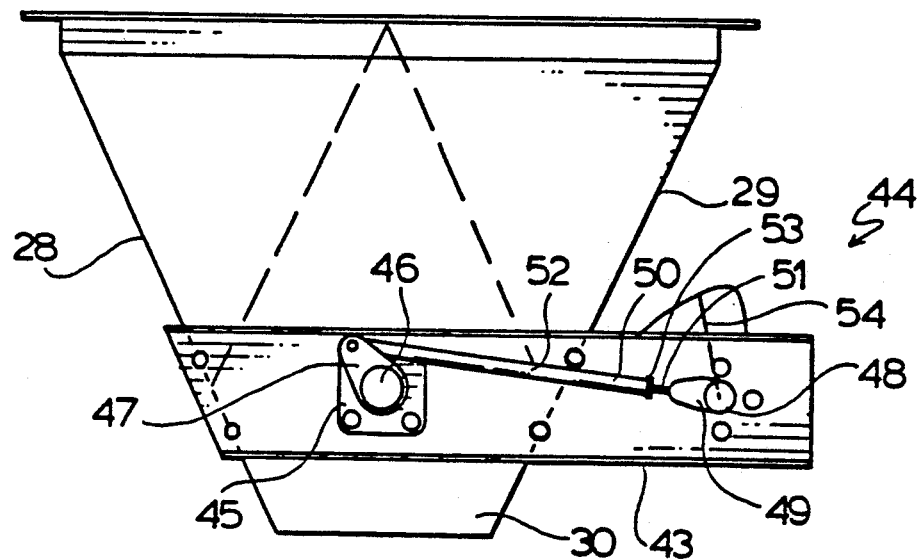
FIG. 9 is an end view of the exterior of the discharge hopper showing a part of the discharge control means.

With reference to FIGS. 7-9, discharge hopper 5, open at its top and bottom, has a cross section of an inverted, truncated isosceles triangle in the direction parallel to heat exchanger plates 3. The top of discharge hopper 5 is provided with a circumferential flange 7a that matches flange 7 of housing 2 for attachment thereto. Discharge hopper 5 has two sloping side walls 28 and 29 and two opposite, parallel, vertical end walls 30 and 31.

Discharge hopper 5 is divided into two parallel bins by means of two panels generally indicated at 32 and 33 contained between vertical end walls 30 and 31 and connected at their top edges at seamweld 34. Seamweld 34 is located on the intersection between the vertical center line of hopper 5 and the baseline of its truncated isosceles triangle cross sections. Panel 32 forms one bin with side wall 28, and panel 33 forms the other bin with side wall 29. The cross section of each bin, as shown in FIG. 8, is an inverted isosceles triangle with base angles preferably the same as the base angles of the truncated isosceles triangle of the cross section of discharge hopper 5. When the angles are the same, the cross section contained between panels 32 and 33 form an isosceles triangle, its baseline schematically indicated with interrupted line 35, congruent with the isosceles triangles formed between panels 32 and 33 and side walls 28 and 29, respectively. Panels 32 and 33 comprise an upper fixed portion 36 and 37, respectively, that is seam welded between the walls 30 and 31, and a lower swinging section 38 and 39, respectively. Upper fixed portions 36 and 37 have a bracket 40 and 41, respectively, in the form of hollow square tubing, welded at the lower edge. The swinging sections 38 and 39 can swing towards each other from brackets 40 and 41 over a controlled distance thereby forming two elongated discharge openings between the swinging sections 38 and 39 and respective side walls 28 and 29 as shown more clearly in FIG. 8. The extent of swing determines the width of the openings and, thereby, the rate of discharge of particulates from discharge hopper 5. End walls 30 and 31 each contain an opening 42 located on the vertical center line of hopper 5 and substantially in the center of baseline 35.

Figure 10:
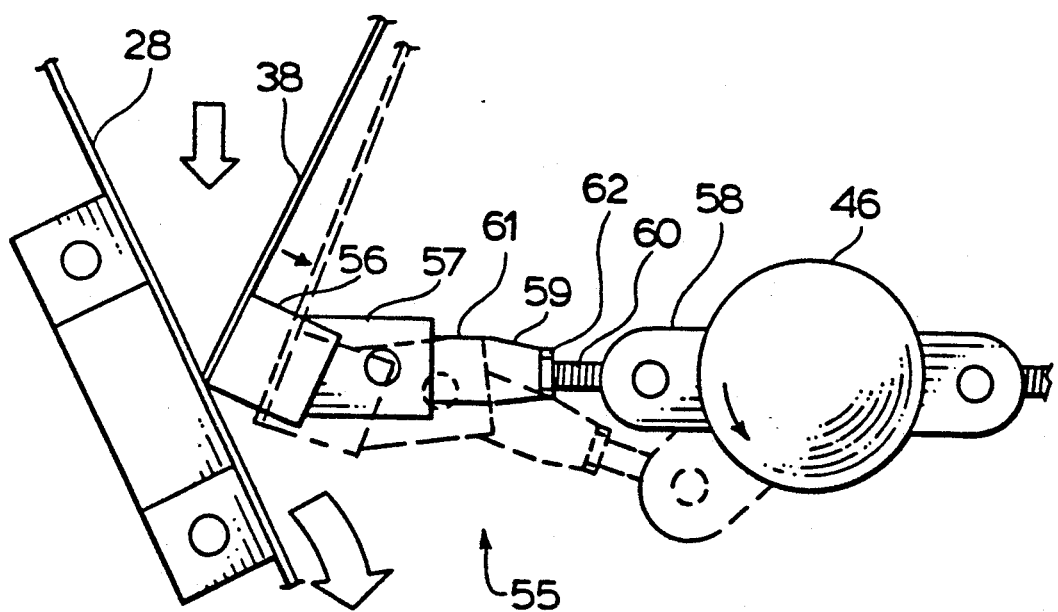
FIG. 10 is an enlarged section of a portion of the discharge control means inside the discharge hopper shown in FIG. 7.

With particular reference to FIGS. 9 and 10, a channel iron 43 extending from sloping side wall 28 to well past side wall 29 is suitably attached such as by bolts to the outside of end wall 0. Channel iron 43 accommodates the particulates discharge control means or actuator, generally indicated with 44, that controls the opening and closing of swinging sections 38 and 39 and, thereby, the amount and rate of particulates discharge from discharge hopper 5.

Channel iron 43 has an opening (not shown) that corresponds with but is smaller than opening 42 in end wall 30. The opening in channel iron 43 is closed with a suitably attached flange bearing 45 adapted to accommodate a rotatable horizontal axle 46 passing through the bearing. The axle 46 extends horizontally from just outside flange bearing 45 and to end wall 31 at the other end of the discharge hopper where the axle is similarly rotatably supported in the center of a flange bearing 45a on a channel iron 43a over an opening 42 in wall 31 (FIG. 7).

An eccentric hub 47 is keyed onto the end of axle 46 that extends from flange bearing 45. A short actuator shaft 48 passes through channel iron 43 on its horizontal center line and in the portion of channel iron 43 that extends past sloping side wall 29. A small eccentric hub 49 is keyed or welded onto short actuator shaft 48 at the same side of channel iron 43 as eccentric hub 47. Actuator link rod 50 is pivotally attached at its ends between the outer extremities of eccentric hubs 47 and 49. The length of actuator link rod 50 is adjustable such as by providing a threaded portion 51 of link rod 50 which portion can screw into the main portion 52 and can be secured with locknut 53.

On the other side of channel iron 43 the short actuator shaft 48 has an actuator arm 54 that is part of actuator 44 and is keyed thereon. By moving actuator arm 54, short actuator shaft 48 may be rotated. The movement of actuator arm 54 may be done manually but is, preferably, controlled by a signal obtained from a level controller depicted by numeral 70 centrally positioned in the top of feed hopper 4. Such level controller, which may, for example, be a capacitance probe, measures and controls the level of particulates in feed hopper 4 and is operatively connected with actuator arm 54. An electric signal from the probe is translated into a pneumatic signal from the controller 70 to the actuator 44, where the pneumatic signal is translated into mechanical movement, if required, to move actuator arm 54.

The axle 46 is operatively linked to both swinging sections 38 and 39 inside discharge hopper 5 by means of one or more pairs of longitudinally spaced linkages 55, one half of which is most clearly shown in FIG. 10. The linkages of a pair are mounted on axle 46 opposite each other in opposite directions and connected with swinging sections 38 and 39, respectively. Preferably, two pairs are provided, each positioned near the opposite ends of axle 46 such that the swinging sections 38 and 39 can be effectively and uniformly operated. Each linkage 55 consists of a bar 56 attached to the lower edge of swinging sections 38 and 39. Bar 56 has two parallel, spaced-apart lobes 57 attached thereto. Two parallel spaced-apart lobes 58 are attached to axle 46. An axle link 59 is pivotally connected between lobes 57 and lobes 58. The length of link 59 is adjustable such as by providing a threaded portion 60 of link 59 which portion can screw into the main portion 61 and can be secured with locknut 62.

In the operation of the method according to the invention, substantially free flowing particulates are fed into the feed hopper 4 of cooler 1. The particulates can be any solid particulates that require cooling and have characteristics that will allow the particulates to descend from feed hopper 4 to the discharge hopper 5 past and between the expanded heat exchanger plates 3 positioned in housing 2. For proper operation of the cooler, the particulates to be cooled should be substantially free-flowing and should have a moisture content that does not interfere with the free flow of particulates through the cooler. If necessary, the particulates may be subjected to drying prior to cooling. Particularly efficient cooling is effected with the method of the invention wherein the difference between the temperature of the particulates leaving the cooler and the temperature of the cooling fluid entering the plates is small such as, for example, from about 5° C. to 15° C. The cooler is especially useful for the cooling of fertilizer particulates. Fertilizer particulates may be chosen from the group consisting of urea, ammonium nitrate, phosphates, ammonium phosphates, ammonium sulfate, potash and mixtures of one or more of these compounds. The caking of fertilizer particulates is an often occurring problem. For example, caking of urea particulates is due to an excessively hot product, especially experienced in warm climates. When the product is too warm the particulates "sinter" together when piled up in storage. To avoid this problem, the urea particulates should be cooled to about 45° C. or lower. Similar problems exist to a greater or lesser extent with other fertilizer particulates and one of the solutions to the problems may be the cooling method of the present invention.

Figure 4:
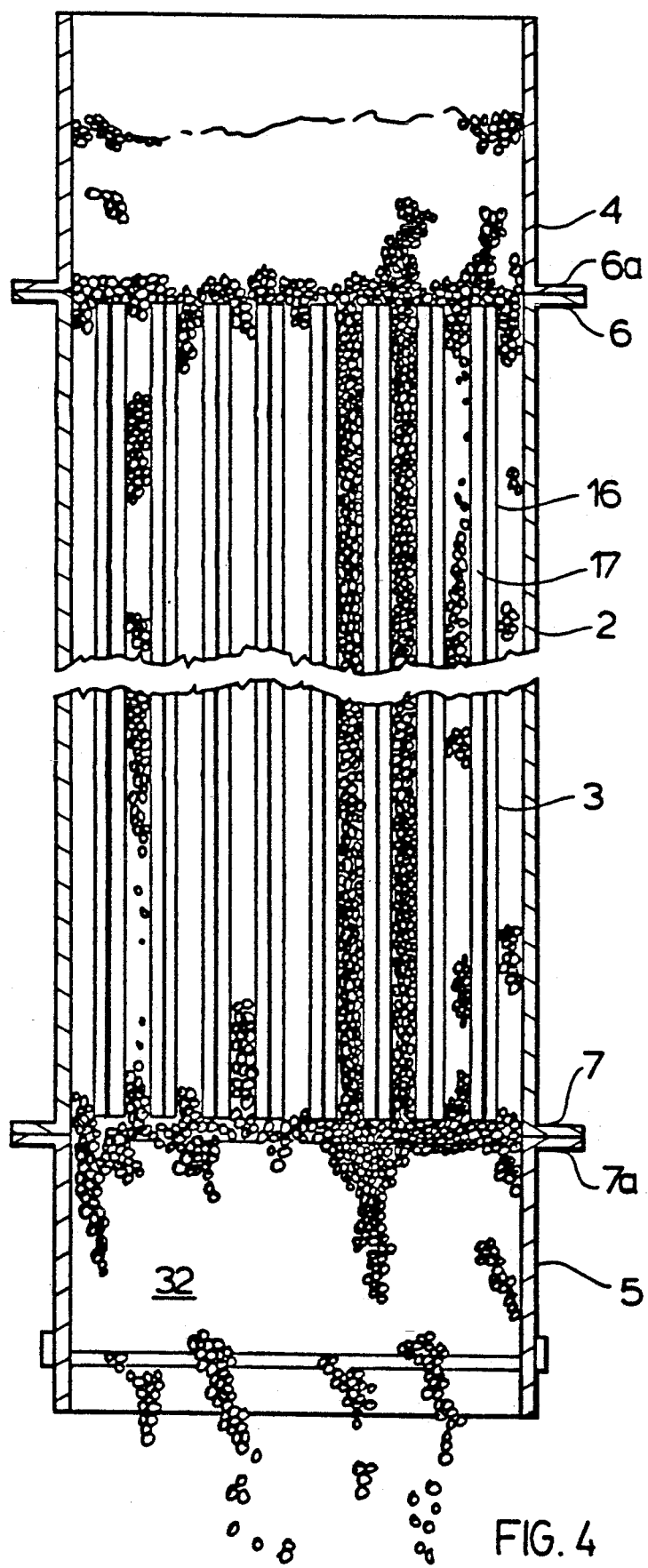
FIG. 4 is a vertical section taken along line 4—4 of FIG. 1 and showing the bottom hopper in elevation partly cut away.

When feeding particulates into feed hopper 4, the material should be evenly distributed over the entire cross section of the housing so that the cooler is operated in a flooded state, as shown in FIG. 4. A flooded state is required to ensure that the maximum cooling capacity of the exchanger is used at all times and that mass flow conditions exist in the cooler. This is easily accomplished by maintaining feed hopper 4 filled to a certain desired level that is controlled by level controller 70 positioned in feed hopper 4. The controller, such as a capacitance probe, is operatively connected with the actuator 44 that controls the position of the swinging sections 38 and 39 and, thereby, controls the amount and the rate of discharge of the particulates from the discharge hopper 5. The particulates flow in mass flow by gravity past and between the heat exchanger plates 3 and are cooled during their passage between the plates. A suitable cooling fluid is fed from a source through inlet pipe 25 into common header 24 wherein the fluid is distributed to the inlets 22 of the plates. The flow of cooling fluid is substantially countercurrent to the direction of flow of the particulates. The fluid flows through the multitude of flow channels of the interconnected pillow-like expansions 21 in a serpentine way defined by seam welds 20 to the outlets 23 and is discharged via common header 26 and outlet pipe 27 to a fluid discharge line.

The suitable cooling fluid may be a gas or a liquid, the latter being preferred, and is chosen such that the desired degree of cooling of the particulates is realized. The preferred cooling liquid is water.

It is noted that the outside surfaces of the heat exchanger plates are substantially smooth to prevent any hang-up of the particulates as they move past it.

The cooled particulates pass by gravity in a continuous uninterrupted flow from the feed hopper between the heat exchanger plates and into the bins of the discharge hopper 5 from which they are discharged at a controlled rate. The angle of the walls of the bins in the discharge hopper is chosen to ensure that mass flow of the particulates over the entire cross section of the cooler is maintained. The optimum angle is generally specific to the material being cooled and it may, therefore, be necessary to adapt the angles of the walls of the discharge hopper to the angle that is optimum for that material.

The apparatus of the invention has no obstructions, means or features that would cause either an interruption in the mass flow of particulates or cause shear forces, friction, turbulence or mixing in the flow of particulates that would result in breakdown, attrition or abrasion of the particulates.

The invention will now be illustrated by means of the following non-limitative example.

EXAMPLE

A cooler was built and operated according to the invention for the cooling of urea particulates.

The cooler has a feed hopper with a height of 61 cm, a housing with a height of 267 cm and a discharge hopper with a height of 96 cm. The cross section of the housing measured 140×149 cm. The angles of the slopping side walls and the panels of the discharge hopper from the vertical were 25°.

The housing contained 52 closely spaced, thin mechanically expanded heat exchanger plates arranged vertically 1.9 cm apart (2.5 cm centers). The heat exchanger plates were made of 18 gauge stainless steel sheets, 244 cm×122 cm, seam-welded along their edges, spot-welded in a regular 4.1×3.6 cm rectangular pattern and seam-welded along five lines partly extending from one vertical side of a plate to the other in alternate fashion and 39.2 cm apart. The interconnected pillow-like expansions of the plates had a cross sectional thickness of 0.6 cm, that is, the thickness of the heat exchanger plates was 0.6 cm.

Urea particulates at a temperature of 54.9° C. where fed into the feed hopper from two screen sets at a rate of 20,450 kg/h and were discharged from the discharge hopper at the same rate. The feed volume to the cooler from the first set of screens was 51.6% and from the second set 48.4% of the total weight of feed. The cooler was maintained in flooded condition and a mass flow regime existed at all times. Cooling water at a temperature of 20.9° C. was pumped at a rate of 55,100 L/h through the heat exchanger plates and discharged from the cooler at 24.3° C. The temperature of the discharged urea was 32.0° C. No degradation or attrition of urea occurred in the cooler as is obvious when comparing the screen analyses of feed and product as shown in Table I.

TABLE I

| Taylor Sieve Series Mesh Size | Feed From Screen 1 % | Feed From Screen 2 % | Combined Feed % | Actual Product % |
|---|---|---|---|---|
| 6 | 0.3 | 0.6 | 0.4 | 0.4 |
| 7 | 13.9 | 24.8 | 19.2 | 19.1 |
| 8 | 64.8 | 86.9 | 75.5 | 75.5 |
| 9 | 91.1* | 97.8 | 94.3 | 94.4 |
| 10 | 97.3 | 99.6 | 98.4 | 98.7 |
| 12 | 99.6 | 99.9 | 99.7 | 99.8 |
| 14 | 99.9 | 00.0 | 99.9 | 99.9 |

The present invention has a number of important advantages. Because particulates descend in a mass flow regime by gravity through the cooler no agitation or turbulence occurs in the material in the cooler. As a consequence, no abrasive conditions exist, essentially no attrition, shear or abrasion occurs, and the cooled particulates are substantially free of fines and dust, i.e., contain substantially no more fines and dust than were contained in the feed to the cooler. No screening or dust control equipment is, therefore, required. As no air is used to effect cooling, no contamination occurs that would require additional means for its elimination. The cooler is simple to maintain and costs considerably less than, e.g., a fluidized bed cooler of equivalent capacity.

I claim:

1. A method for the cooling of substantially free-flowing particulates in a cooler, said cooler including a housing having a cross section and containing a multiplicity of parallel, horizontally and closely spaced, vertical, expanded heat exchanger plates having smooth exterior surfaces defining flow passages therebetween, said heat exchanger plates being spaced at a distance in the range of about 15 to 100 mm measured from center to center of said plates, said heat exchanger plates each having a thickness in the range of about 5 to 10 mm, each heat exchanger plate having continuous interior flow channels for the flow of cooling fluid therein; a fluid inlet and a fluid outlet in communication with said flow channels in each plate; a common cooling fluid inlet header connected to the fluid inlets of the multiplicity of plates; a common cooling fluid outlet header connected to the fluid outlets of the multiplicity of plates; a feed hopper positioned above and attached to said housing and in communication with said flow passages; and a discharge hopper positioned below and attached to said housing and in communication with said flow passages, said discharge hopper having flow control means for the controlled discharging of particulates from said discharge hopper; comprising the steps of passing a flow of a suitable cooling fluid from said fluid inlet, through said inlet header, through said heat exchanger plates and through said outlet header to said fluid outlet; feeding said particulates to said feed hopper and evenly distributing said particulates over the entire cross section of said housing; passing said particulates through said flow passages from said feed hopper to said discharge hopper by gravity under flooded, mass flow conditions of the particulates in the cooler; collecting said particulates after passing through said flow passages in the discharge hopper for discharge therefrom; and controlling the discharge of the particulates at a rate and in an amount relative to the feed of particulates so that said flow passages and the feed hopper are maintained at all times in said flooded state with respect to said particulates, whereby maximum cooling of the particulates is ensured and whereby said particulates pass through said cooler substantially without turbulence, and abrasion and attrition of the particulates are substantially diminished.

2. A method as claimed in claim 1 wherein said controlling is carried out by monitoring the level of the particulates in said feed hopper with a level controller operatively connected to the discharge hopper flow control means and discharging the particulates from the discharge hopper at a rate whereby the level of particulates in the feed hopper is maintained at a predetermined level ensuring said flooded state.

3. A method as claimed in claim 1 wherein said controlling is carried out by monitoring the level of the particulates in said feed hopper with a level controller operatively connected to the discharge hopper flow control means, said discharge hopper includes two adjacent parallel tapered bins each having a side comprising a swinging section for allowing the discharge of particulates, sending a signal from said level controller to said flow control means and activating each said swinging section in response to said signal for controlled discharge of said particulates from said cooler at a rate whereby the level of particulates in the feed hopper is maintained at a predetermined level ensuring said flooded state.

4. A method as claimed in claim 1 wherein said expanded plates are spaced at a distance in the range of about 15 to 50 mm measured from center to center of said plates.

5. A method as claimed in claim 1 wherein said expanded plates are spaced on about 25 mm centers, and each plate has a thickness of about 6 mm.

6. A method as claimed in claim wherein said particulates are fertilizer particulates and said cooling fluid is a liquid.

7. A method as claimed in claim 6 wherein said fertilizer particulates comprise one or more fertilizers chosen from the group consisting of urea, ammonium nitrate, phosphates, ammonium phosphates, ammonium sulfate, potash and mixtures thereof, and wherein said cooling fluid is water.

* * * * *

UNITED STATES PATENT AND TRADEMARK OFFICE
CERTIFICATE OF CORRECTION

PATENT NO. : 5,167,274
DATED : December 1, 1992
INVENTOR(S) : Markus M. Mueller

It is certified that error appears in the above-indentified patent and that said Letters Patent is hereby corrected as shown below:

On the title page, insert the following after item [22] Filed: October 7, 1991:
    --[63]    Related U.S. Application Data
        Continuation-in-part of Ser. No. 236,818, August 26, 1988, abandoned.

Column 1, line 4, insert the following:
    --This application is a continuation-in-part of U.S. Ser. No. 07/236,818, filed August 26, 1988, now abandoned.--.

Signed and Sealed this

Twenty-sixth Day of April, 1994

*Attest:*

BRUCE LEHMAN

*Attesting Officer*    *Commissioner of Patents and Trademarks*